A. VASSELLI.
TUBULAR JOINT.
APPLICATION FILED MAY 5, 1919.

1,379,141.

Patented May 24, 1921.

Inventor
Anthony Vasselli
his Attorneys

UNITED STATES PATENT OFFICE.

ANTHONY VASSELLI, OF NEWARK, NEW JERSEY, ASSIGNOR, BY MESNE ASSIGNMENTS, TO HARRIMAN NATIONAL BANK OF THE CITY OF NEW YORK, TRUSTEE.

TUBULAR JOINT.

1,379,141. Specification of Letters Patent. Patented May 24, 1921.

Application filed May 5, 1919. Serial No. 294,707.

*To all whom it may concern:*

Be it known that I, ANTHONY VASSELLI, a citizen of the United States, and a resident of the city of Newark, county of Essex, and State of New Jersey, have invented a certain new and useful Tubular Joint, of which the following is a specification.

My invention relates to joints for tubes and more particularly for the tubes used in the manufacture of tone-arms for talking machines.

It is the common practice in making joints in tone-arms, and other similar tubular structures, to telescope the end of a tube of small diameter into the end of a tube of larger diameter and to solder or braze the members together. The principal strains to which such structures are subjected are twisting strains due to careless handling when raising the reproducer from contact of its stylus with the record, or in rotating the reproducer in placing it on, or removing it from the extremity of the tone-arm. To prevent breaking of the joint it is customary to secure the ends of the tubes together by means of a screw; this produces an unsightly structure. Such a tube shows a series of steps and the screw heads are prominent and a source of more or less danger to the hands of the operator.

The object of my invention is the production of a tubular joint which will not mar the exterior surface of the elements joined together, whereby a flush construction is produced, and the joint is invisible in the finished product.

Another object of my invention is to provide means which will securely lock the tubular joint in such a manner as to effectively prevent movement of the sections relatively to each other.

Further objects of my invention are to provide means for preventing relative movement of the jointed tubular section, wherein drilling will be avoided, screws and the like will be eliminated, which will be simple in construction, which will securely hold the parts in proper position, be thoroughly reliable and efficient in its purpose, and economical and inexpensive to manufacture.

With these and other objects in view to be more fully set forth hereinafter, the invention consists in the novel construction, combination of elements, and arrangement of parts which will be exemplified in the construction hereinafter described in the specification and illustrated in the accompanying drawings considered together or separately.

The invention will be first described in connection with the accompanying drawings illustrating one embodiment of my invention, wherein similar reference characters are used to designate corresponding parts throughout the several views, and then more specifically defined and indicated in the appended claims.

In the drawings,—

Figure 1:
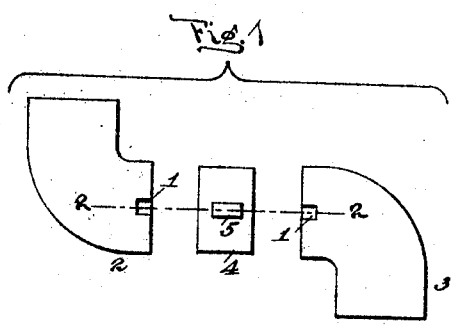
Figure 1 is a side elevation of the members which go to make up the joint of my invention.
Figure 2:
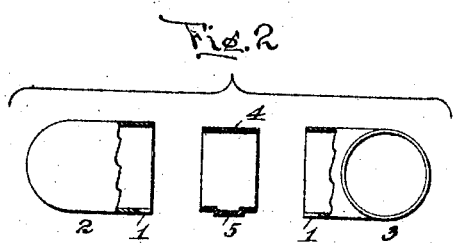
Fig. 2 is a plan view partly in section, the section being taken on the line 2—2 of Fig. 1.
Figure 3:
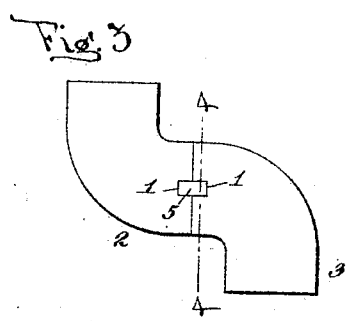
Fig. 3 is a side elevation of the complete joint.
Figure 4:
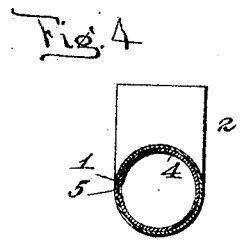
Fig. 4 is a transverse section on the line 4—4 of Fig. 3.

In carrying out my invention, I provide a notch 1 in the tubular members 2 and 3 which are to be joined so as to construct a continuous tube. The notches are in absolute alinement when the tubular members 2 and 3 are in the position which they will assume when the joint is completed.

I next provide a member 4 composed of a short section of tubing having its outside diameter slightly less than the inside diameter of the tubular members 2 and 3. A projection 5 is formed on one side of the member 4. The projection is preferably formed by punching the material from the inside of the section outward to a distance or height equal to the thickness of the material of the tubular members 2 and 3 and to coincide with the outer circumference of the tubular members to be joined. The projection is of such a width as to have a driving fit with the notches 1 of the tubular members 2 and 3. The length of the projection is about that of the combined depths of the notches and said projection is preferably formed within the edges of the section 4 and located about centrally therebetween.

The member 4 is forced into the end of the member 2 for example, and projection 5 will be forced into the notch 1 of that member. The member 4 may now be soldered or brazed in the member 2 with one-half thereof projecting beyond the end of the tubular member 2.

The tubular member 3 is now forced over the exposed end of the member 4, and the projecting half of the projection 5 is forced home in the notch 1 of the tubular member 3, which may then be soldered in position.

In assembling the parts, as above described, the projection 5 entering the notches in the tubular members and engaging the sides and ends thereof, serves as a stop to limit the movement of the tubular members upon the short section of tubing, and thus not only positions the tubular members upon the section of tubing, but also locks the parts against relative rotation.

The close fitting of the elements of the joint will make the actual line of the joint inconspicuous and when the structure is buffed and electroplated or otherwise coated as is common, the line will disappear and give the effect of a single piece of tubing.

I wish it distinctly understood that while I have illustrated my invention in connection with a tubular section applied to a talking machine, that my invention is not to be so limited, as it is obvious that the same can be utilized in other structures where it is desirable to use a jointed tubular section.

By the use of my invention, I am enabled to use tubes of uniform diameter, and one bending die may be used, whereas, in the old structures where telescoping tubes were used and the same were fastened together by screws or other means, the tubes were always of different diameter, and hence it was necessary to employ dies of different diameters to make such tubes.

While I have shown the projection 5 as punched in the member 4, I desire to have it understood that it may be formed in other ways.

In accordance with the provisions of the patent statute, I have described the principle of my invention together with the apparatus which I now consider to represent the best embodiments thereof, but I desire it understood that my invention is not confined to the particular form of apparatus herein shown and described, the same being merely illustrative, and that the invention can be carried out in other ways without departing from the spirit of my invention, and, therefore, I claim broadly the right to employ all equivalent instrumentalities coming within the scope of the appended claims, and by means of which objects of my invention are attained, and the new results accomplished, as herein set forth.

Having now described my invention what I claim and desire to secure by Letters Patent is:—

1. A tubular joint, comprising two tubular members having notches in their opposing ends, and a section of tubing of slightly less diameter than said tubular members and adapted to be fitted in the opposed ends of said notched members and provided with a projection adapted to enter and engage the sides and ends of the notches in said members, and serving to limit the movement of and position said tubular members upon said section of tubing in assembling the parts.

2. A tubular joint, comprising two tubular members having notches in their opposed ends, and a section of tubing of slightly less diameter than said tubular members and having a projection upon its outer surface of a length substantially equal to the combined lengths of the notches in said tubular members, the said section of tubing adapted to be fitted in the opposed ends of said tubular members with its projection entering and engaging the sides and ends of said notches to thereby limit the movement of and position said tubular members upon said section of tubing when the parts are assembled and lock said parts together.

3. A tubular joint, comprising two tubular members having notches in their opposing ends, and a section of tubing of slightly less diameter than said tubular members and having a projection upon its outer surface of a length substantially equal to the combined lengths of said notches and of a height substantially equal to the thickness of the material of said tubular members, the said section of tubing adapted to be fitted in the opposed ends of said tubular members with its projection entering and engaging the sides and ends of the said notches, to thereby limit the movement of and position said tubular members upon said section of tubing with their ends abutting and thus locking said parts together.

4. A tubular joint, comprising two tubular members having notches in their opposed ends, and a section of tubing of slightly less diameter than said tubular members and having a projection upon its outer surface of a length less than the length of the section of tubing and equal to the combined lengths of the notches in the ends of the tubular members and of a height substantially equal to the thickness of the material of said tubular sections, the said section of tubing adapted to be fitted in the opposing ends of said tubular members with its projection entering and engaging the sides and ends of the said notches, to thereby limit the movement of and position said tubular members upon said section of tubing with their ends abutting, and thus locking the parts together.

This specification signed and witnessed this 18th day of April 1919.

ANTHONY VASSELLI.

Witnesses:
JOHN L. LOTSCH,
M. JONES.